United States Patent Office 3,341,561
Patented Sept. 12, 1967

3,341,561
PREPARATION OF SALTS OF ALKANESULFONIC ACIDS
Charles M. Starks, Ponca City, Okla., assignor to Continental Oil Company, Ponca City, Okla., a corporation of Delaware
No Drawing. Filed May 31, 1963, Ser. No. 284,383
12 Claims. (Cl. 260—448)

This invention relates to the preparation of alkane sulfonates and particularly those having the sulfonate group attached to terminal carbon atom of a straight chain alkyl group.

It is difficult to obtain substantially pure alkanesulfonates by the presently known procedures. Methods are known for preparing alkanesulfonic acid having 2–6 carbon atoms in more or less pure form, particularly in the lower carbon atom contents. Medium carbon content alkanesulfonic acids are of limited availability, especially of the straight chain types. The higher carbon content alkanesulfonic acids are normally mixtures of isomers and usually include two or more different carbon atom containing acids. The salts of these acids also include these same less desirable features.

It is known that aqueous solutions of alkanesulfinates, i.e., salts of alkanesulfinic acid (RSOOH; $RSO_2H$), oxidize to the corresponding alkanesulfonates. P. Allen, J. Org. Chem., 7, 23 (1942), and Marvel and Johnson, J. Org. Chem., 13, 822 (1948), have observed that magnesium alkanesulfinates, such as, magnesium dodecanesulfinate, oxidize very slowly in low yield to the corresponding alkanesulfonates, i.e., $RSO_3M$.

The alkyl-metal compounds, such as trialkyl aluminum and dialkyl magnesium, react with sulfur dioxide to form the corresponding metal alkanesulfinate, as shown:

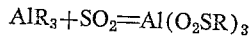

$$AlR_3 + SO_2 = Al(O_2SR)_3$$

Methods are known and used on a commercial scale for preparing pure alkyl-metal compounds, or mixtures having isomeric alkyls. Hight purity straight chain alkyl-metal compounds are available in commercial quantities. The oxidative procedures previously mentioned can be used to produce metal alkanesulfonates of purity corresponding to that of the alkyl-metal from which the sulfinate was obtained. However, the rate and yield provided by the prior art is not acceptable for competitive commercial operation.

An object of this invention is a process for converting salts of alkanesulfinic acid ($RSO_2M$) to the corresponding salts of alkanesulfonic acid ($RSO_3M$) at a reasonable rate and in high yield. Another object is such a process for preparing alkanesulfonates of high carbon number. Yet another object is such a process for preparing alkanesulfonates having a straight chain alkane portion and with the sulfonate ($—SO_3M$) portion joined to a terminal carbon atom. Other objects of the invention will become apparent in the detailed description thereof.

It has been discovered that alkanesulfinates can be converted to the corresponding alkanesulfonates rapidly and in good yield by carrying out the oxidation in the presence of an oxidation rate accelerator (catalyst) metal salt having appreciable solubility in the aqueous reaction medium.

The oxidation rate accelerator (catalyst) used in the process of the invention is a metal capable of existence in more than one valence state and whose ions are present in solution in the aqueous reaction medium in an amount sufficient to accelerate the oxidation rate of the alkanesulfinate to alkanesulfonate. Illustrations of suitable metals are: cobalt, copper, iron, lead, manganese, nickel, silver, tin, titanium, uranium, vanadium and zirconium. Iron, nickel, cobalt and lead are preferred metals. It is preferred to use salts having substantial water solubility.

An accelerating (catalytic) amount of the dissolved metal ions must be present. The amount used is related to the type of metal and to the degree of oxidation acceleration desired. Commonly, the metal ion affording salt will be present in an amount of less than about 2 percent by weight based on the metal alkanesulfinate charged. In the case of the iron, nickel and cobalt salts, commonly 0.1–1 percent by weight is present.

The oxidation may use free-oxygen in the pure form or air itself. Oxygen affording compounds may be used as long as these do not interfere with the desired result of high purity alkanesulfonate production. Hydrogen peroxide and the alkali metal permanganates are especially suitable oxygen affording compounds.

Sufficient oxidizer is used to attain the desired degree of conversion. Normally an excess of oxidizer is used in order to obtain essentially complete conversion of the alkanesulfinate charge.

The oxidation reaction is carried out in an aqueous reaction medium. It is desirable to operate with a medium having a pH of not more than about 7.

In the case of the acidic media, it has been found the oxidation follows zero-order kinetics with respect to the sulfinate concentration when the accelerator is present; the time to attain a given degree of conversion is related only to the temperature of the reaction zone. The temperature used in the process is dependent on the boiling point of the reaction system, i.e., alkanesulfinate, alkanesulfonate and water; and also on the thermal degradation temperature of the sulfinate. Generally, suitable temperatures are about 50° C.–200° C.; more usually about 50° C.–125° C.; most commonly the range of about 80° C.–110° C.

Time is normally controlled to provide essentially complete conversion of the sulfinate to the corresponding sulfonate. Dependent upon the temperature and the accelerator, essentially complete conversions are obtainable in times over the range of about 15 minutes to about 2 hours.

Completion of the conversion reaction is readily determined by potassium permanganate titration; when no permanganate is consumed, the conversion is complete.

The process of the invention is applicable to any alkanesulfinate, which is appreciably soluble in water—the oxidation reaction being carried out in an aqueous medium. The alkanesulfinates having 1–20 carbon atoms form a good charge to the process. Although the metal alkanesulfinates made from alkyl-metal compounds are a preferred source of charge to the process, the process is not limited to these metals. Ammonium alkanesulfinate is a suitable charge. Because of their availability as alkyl-metal compounds and the low solubility of their hydroxides, aluminum and magnesium alkanesulfinates are a preferred charge to the process.

Oxidation of metal alkanesulfinate results in the formation of the corresponding metal alkanesulfonate. Usually the product can be recovered from the aqueous medium as a bottoms from distillation of the total reaction product mixture.

When it is desired to produce an alkanesulfonate containing a different cation (hereinafter written as "cation metal") than that in the sulfinate, it is preferred to charge to the oxidation reaction a sulfinate of a metal capable of reacting with hydroxyl ions to form a hydroxide of low solubility in water; to obtain the desired product, the aqueous reaction product medium is treated with alkali metal hydroxide or ammonium hydroxide to get a pH above 7 whereby the cation metal of the sulfinate charge is precipitated as the insoluble metal hydroxide, leaving in solution either ammonium or alkali metal alkanesulfonate.

This aqueous product solution is separated from the precipitate; usually this is done by filtering but it could be done by centrifuging or simple decanting. The product is then recoverable as a distillation bottoms fraction from the separated solution.

By using the preferred iron, nickel, cobalt and lead salt accelerators, the accelerator will also precipitate along with the cation metal hydroxide, whereby a purification operation with respect to the alkanesulfonate is eliminated.

While it is preferred to use the 2 step procedure above, it is possible to simultaneously oxidize the metal alkanesulfinate and to precipitate both the cation metal and the accelerator metal, leaving in solution either alkali metal or ammonium alkanesulfonate product.

EXAMPLES

*Example I and Test I*

Distilled water 150 parts and 150 parts of acetic acid were placed in a distillation flask. 10 parts of aluminum 1-octanesulfinate was charged. Ferrous sulfate, 0.1 part, was charged as the accelerator. The contents of the flask were brought to reflux temperature and a stream of air introduced. The conversion was followed by permanganate titration; complete conversion was obtained in 40 minutes.

The contents were cooled and concentrated ammonium hydroxide added, with warming. Aluminum hydroxide was precipitated; this was removed by filtration. The filtrate was evaporated to dryness; a yield at 73% of the theoretical of ammonium 1-octanesulfonate was obtained.

In Test I the above was repeated except that *no* accelerator was present. The time for reaction, to 97% completion, was 2.5 hours.

*Example II and Test II*

The conditions of Example I was repeated except that magnesium 1-butanesulfinate was the charge. The reaction was complete in 0.2 hour to give magnesium 1-butanesulfonate.

In Test II, carried out as in Example II except no accelerator was present, the 97% completion time was 1.3 hours.

Other examples were carried out using aluminum and magnesium 1-alkanesulfinates having up to and including 20 carbon atoms. In each instance the oxidation proceeded without incident and the sodium or ammonium 1-alkanesulfonate was obtained.

It is to be understood that the above examples are not limiting and the invention is limited only as set forth in the claims.

The alkanesulfonates of this process can be used anywhere that these compounds are now used, e.g. fat splitting, motor oil additives, polyvinylchloride heat stabilizers, etc.

Thus having described the invention, what is claimed is:

1. A process for preparing a salt of an alkanesulfonic acid which process comprises oxidizing, in an aqueous medium, a metal salt of an alkanesulfinic acid, at a temperature substantially below the decomposition temperature of said alkanesulfinate and for a time to oxidize an appreciable amount of said alkanesulfinate to the corresponding alkanesulfonate, in the presence of dissolved ions of a metal capable of existence in more than one valence state, said ions being present in an amount sufficient to accelerate said oxidation reaction, said metal being selected from the class consisting of iron, cobalt and nickel.

2. The process of claim 1 wherein said temperature is between about 50° C. and about 200° C., said time is between about 15 minutes and 2 hours, so that essentially all of said alkanesulfinate is oxidized to the corresponding alkanesulfonate.

3. The process of claim 1 wherein said alkanesulfinate has 1–20 carbon atoms.

4. A process for preparing a salt of an alkanesulfonic acid which process comprises:

(A) oxidizing, in an aqueous medium having a pH of not more than about 7, a metal alkanesulfinate, said metal being capable of reacting with hydroxyl ions to form a hydroxide of low solubility in water, at a temperature of between about 50° C. and about 200° C., which reaction temperature is held below the decomposition temperature of said alkanesulfinate, for a time such that substantially all of said alkanesulfinate is oxidized to the corresponding alkanesulfonate, and in the presence of metal ions in an amount of at least sufficient to accelerate said oxidation reaction, said ions being derived from a metal capable of existing in more than one valence state, said metal being selected from the class consisting of iron, cobalt and nickel, (B) treating said alkanesulfonate-containing aqueous reaction product with an ion selected from the group consisting of ammonium and alkali metal, at a pH above 7, to obtain an aqueous solution of product alkanesulfonate and a precipitate of metal hydroxide and, (C) separating said aqueous solution of product alkanesulfonate from said precipitate.

5. The process of claim 4 wherein said alkanesulfonate product is recovered from the separated solution of step (C) by evaporating the solvent.

6. The process of claim 4 wherein said alkanesulfinate has 1–20 carbon atoms.

7. The process of claim 4 wherein said metal alkanesulfinate is aluminum alkanesulfinate.

8. The process of claim 4 wherein said metal alkanesulfinate is magnesium alkanesulfinate.

9. The process of claim 4 wherein said temperature is about 80–110° C.

10. The process of claim 4 wherein said accelerator metal salt is present in an amount of about 0.1–1 weight percent, based on said metal alkanesulfinate charged.

11. A process for preparing a salt of an alkanesulfonic acid which process comprises oxidizing, in an aqueous medium, a metal salt of an alkanesulfinic acid, at a temperature substantially below the decomposition temperature of said alkanesulfinate and for a time to oxidize an appreciable amount of said alkanesulfinate to the corresponding alkanesulfonate, in the presence of dissolved ions of iron, said ions being present in an amount sufficient to accelerate said oxidation reaction.

12. A process for preparing a salt of an alkanesulfonic acid which process comprises:

(A) oxidizing, in an aqueous medium having a pH of not more than about 7, a metal alkanesulfinate, said metal being capable of reacting with hydroxyl ions to form a hydroxide of low solubility in water, at a temperature of between about 50° C. and about 200° C., which reaction temperature is held below the decomposition temperature of said alkanesulfinate, for a time such that substantially all of said alkanesulfinate is oxidized to the corresponding alkanesulfonate, and in the presence of iron ions in an amount of at least sufficient to accelerate said oxidation reaction, (B) treating said alkanesulfonate-containing aqueous reaction product with an ion selected from the group consisting of ammonium and alkali metal, at a pH above 7, to obtain an aqueous solution of product alkanesulfonate and a precipitate of metal hydroxide and, (C) separating said aqueous solution of product alkanesulfonate from said precipitate.

References Cited

UNITED STATES PATENTS 2,187,144  1/1940  Bell et al. _____ 260—400

TOBIAS E. LEVOW, *Primary Examiner.*

H. M. S. SNEED, *Assistant Examiner.*